United States Patent
Kahn et al.

(10) Patent No.: US 9,961,022 B1
(45) Date of Patent: May 1, 2018

(54) BURST ABSORPTION FOR PROCESSING NETWORK PACKETS

(71) Applicant: Amazon Technologies, Inc., Seattle, WA (US)

(72) Inventors: Asif Kahn, Cedar Park, TX (US); Thomas A. Volpe, Austin, TX (US)

(73) Assignee: Amazon Technologies, Inc., Reno, NV (US)

( * ) Notice: Subject to any disclaimer, the term of this patent is extended or adjusted under 35 U.S.C. 154(b) by 156 days.

(21) Appl. No.: 14/981,647

(22) Filed: Dec. 28, 2015

(51) Int. Cl.
*H04L 12/861* (2013.01)

(52) U.S. Cl.
CPC ................................. *H04L 49/9042* (2013.01)

(58) Field of Classification Search
CPC . H04L 49/9042; H04L 49/90; H04L 49/9047; H04L 49/9052; H04L 49/9057; H04L 49/9063
See application file for complete search history.

(56) References Cited

U.S. PATENT DOCUMENTS

| | | | | |
|---|---|---|---|---|
| 6,728,209 B2* | 4/2004 | Pate | .................... | H04L 12/5601 370/230.1 |
| 6,738,371 B1 | 5/2004 | Ayres | | |
| 8,665,725 B2* | 3/2014 | Kwan | ................. | H04L 49/9005 370/229 |
| 9,083,635 B1* | 7/2015 | Kelly | ..................... | H04L 47/21 |
| 9,338,105 B2* | 5/2016 | Griswold | ............ | H04L 49/9063 |
| 9,634,958 B2* | 4/2017 | Ennaji | ................... | H04L 47/828 |
| 9,674,102 B2* | 6/2017 | Levy | ....................... | H04L 47/32 |
| 2003/0086372 A1* | 5/2003 | Pate | ....................... | H04J 3/0632 370/235 |
| 2003/0210681 A1* | 11/2003 | Sumi | ......................... | H04L 1/22 370/352 |
| 2005/0147095 A1 | 7/2005 | Guerrero et al. | | |
| 2013/0155859 A1* | 6/2013 | Kwan | ................. | H04L 49/9005 370/235 |
| 2013/0329558 A1 | 12/2013 | Kucharewski et al. | | |
| 2014/0064079 A1* | 3/2014 | Kwan | ..................... | H04L 47/12 370/234 |
| 2014/0211634 A1* | 7/2014 | Matthews | ........... | H04L 47/6255 370/241 |
| 2014/0359231 A1 | 12/2014 | Matthews | | |
| 2015/0063367 A1 | 3/2015 | Griswold et al. | | |
| 2015/0222547 A1* | 8/2015 | Hayut | ..................... | H04L 49/00 709/223 |

* cited by examiner

*Primary Examiner* — Tri H Phan (74) *Attorney, Agent, or Firm* — Robert C. Kowert; Meyertons, Hood, Kivlin, Kowert & Goetzel, P.C.

(57) ABSTRACT

Packet processors may implement burst absorption for processing network packets. Network packets may be processed at a packet processor according to a packet processing rate. For network packets that do not exceed the packet processing rate, processing of the network packets commences without an intervening buffer to store packet metadata. For network packets that exceed the packet processing rate, control metadata may be stored in a buffer at the excessive processing rate separate from packet data until removed from the buffer for processing according to the packet processing rate. In some embodiments, pipeline bubbles may be inserted by delaying the removal of packet metadata from the burst absorption buffer in order to start a pipeline bubble through forwarding stages of a packet processor.

19 Claims, 6 Drawing Sheets

BURST ABSORPTION FOR PROCESSING NETWORK PACKETS

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or others limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement burst absorption for processing network packets. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. For example, a next hop address may be determined which identifies the next immediate destination to which the network packet may be sent. Once a forwarding decision is made, modifications to the packet may or may not be performed, and the packet sent to a next networking device connected to the current networking device (or the networking packet may be dropped). Forwarding of the network packet may continue amongst the networking devices of a network until the network packet reaches the desired destination.

The performance of forwarding network packets may be subject to the performance of individual networking devices, and thus the packet processors and pipelines for making forwarding decisions for network packets at the networking devices. As networked systems and environments are dynamic, the amount of network traffic or load placed upon individual networking devices may vary. In some instances, networking devices may experience bursts of network packets in a stream of network packets that may exceed the rate at which the packets may be processed. Typically, networking devices attempt to buffer the packets and pull them from the buffer when ready or available to start processing. When the processing buffer is full, subsequently received network packets may be dropped. Networking devices that buffer all incoming networking traffic however introduce latency into the packet processing pipeline by storing and then retrieving every packet. In various embodiments, packet processing pipelines may be implemented that process network packets without buffering entire packets, instead allowing metadata for packets to enter the packet processing pipeline directly. In order to accommodate bursts of network packets, burst absorption techniques may be implemented which still preserve the ability to directly process network packets through the pipeline when non-burst traffic resumes.

Figure 1A:
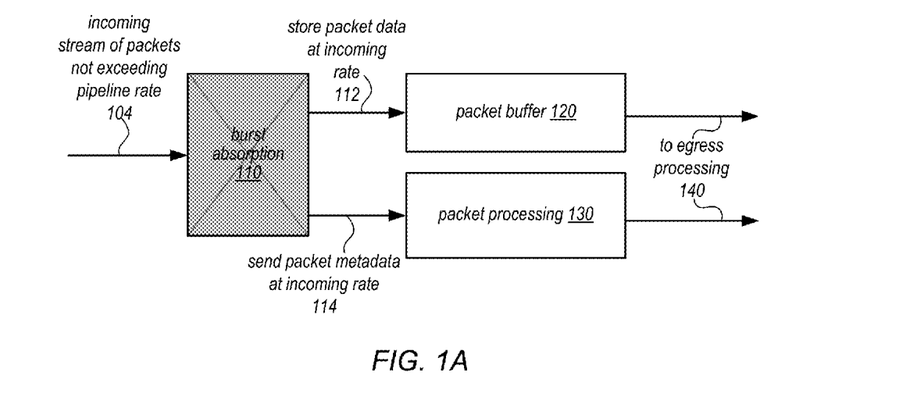
FIGS. 1A and 1B illustrate logical block diagrams of burst absorption for processing network packets, according to some embodiments.
Figure 1B:
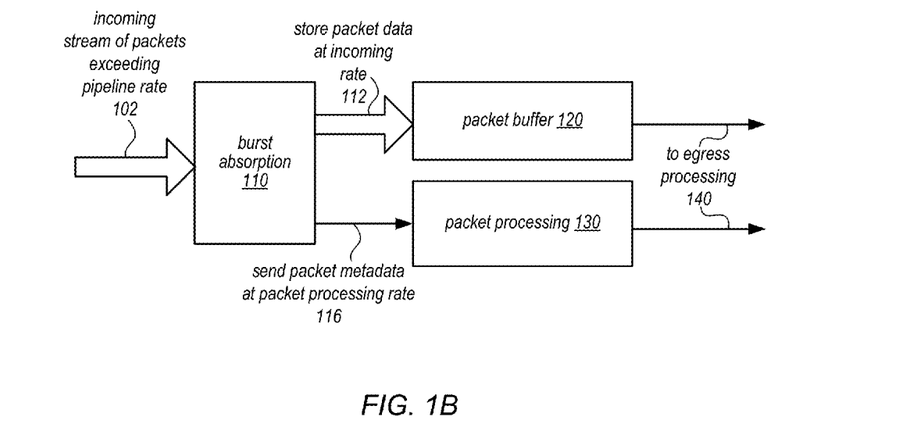

FIGS. 1A and 1B illustrate logical block diagrams of burst absorption for processing network packets, according to some embodiments. In FIG. 1A, packet processing 130 may be implemented at a packet processor, such as packet processor 250 in FIGS. 2 and 3, to perform various forwarding operations, lookups, comparisons, and other techniques to determine a forwarding decision for network packets received at a networking device, or perform any other packet processing operations. Packet processing 130 may operate at a particular packet processing rate (e.g., 1 billion packets per second (Gpps)) so that packets received at less than the packet processing rate may proceed directly to packet processing 130. For example, as illustrated in FIG. 1A, the incoming stream of network packets 104 does not exceed the pipeline rate. Thus, burst absorption 110 is un-necessary and may not be performed, allowing both packet data 112 and packet metadata 114 to be sent to the respective processing stages, packet buffer 120 (which may hold packet data until egress) and packet processing 130, at the incoming rate.

As illustrated in FIG. 1B, at times the stream of incoming network packets 102 may exceed the packet processing rate. In such scenarios, burst absorption 110 may buffer packet metadata according to the incoming rate while continuing to allow the packet data to be stored 112 at packet buffer 120 at the incoming rate. In at least some embodiments, the packet buffer 120 may store packet data at the same maximum rate as network interfaces that provide network packets so that packet buffer 120 is not a constraint on processing network packets. The processing of network packet metadata may continue to be performed in parallel with packet data buffering at packet forwarding pipeline 130 by removing packet metadata according to the packet processing rate 116. By maintaining packet metadata in a buffer when the incoming rate exceeds the packet processing rate, bursts of network packets may be handled without requiring that all network packets be buffered. Implementing burst absorption buffers also allows for other packet processing pipeline controls, such as inserting pipeline bubbles by delaying the removal of network packet metadata from the burst absorption buffer, as discussed below with regard to FIG. 6.

Please note that the previous descriptions of burst absorption for processing network packets is not intended to be limiting but is provided as a logical example of burst absorption. Other scenarios than those illustrated and discussed above may occur. For example, the incoming stream of packets may drop from a rate of packets exceeding the packet processing rate to an incoming rate that is below the packet processing rate. As the metadata for network packets has been stored in burst absorption buffer 110, there may be a period of time where packets are processed from burst absorption buffer 110 at the packet processing rate until burst absorption buffer 110 is clear. Once clear, packet metadata may again begin being processed at the lower incoming rate. In addition to different scenarios not illustrated, different organization of components, entries, and other depicted items may be different than those illustrated in FIG. 1.

This specification begins with a general description of a networking device, which may utilize burst absorption for processing network packets to perform forwarding of network packets at a packet processor. Then various examples of a packet processor are discussed, including different components/modules, or arrangements of components/modules that may be implemented. A number of different methods and techniques to implement burst absorption for processing network packets are then discussed, some of which are illustrated in accompanying flowcharts. Various examples are provided throughout the specification.

Figure 2:
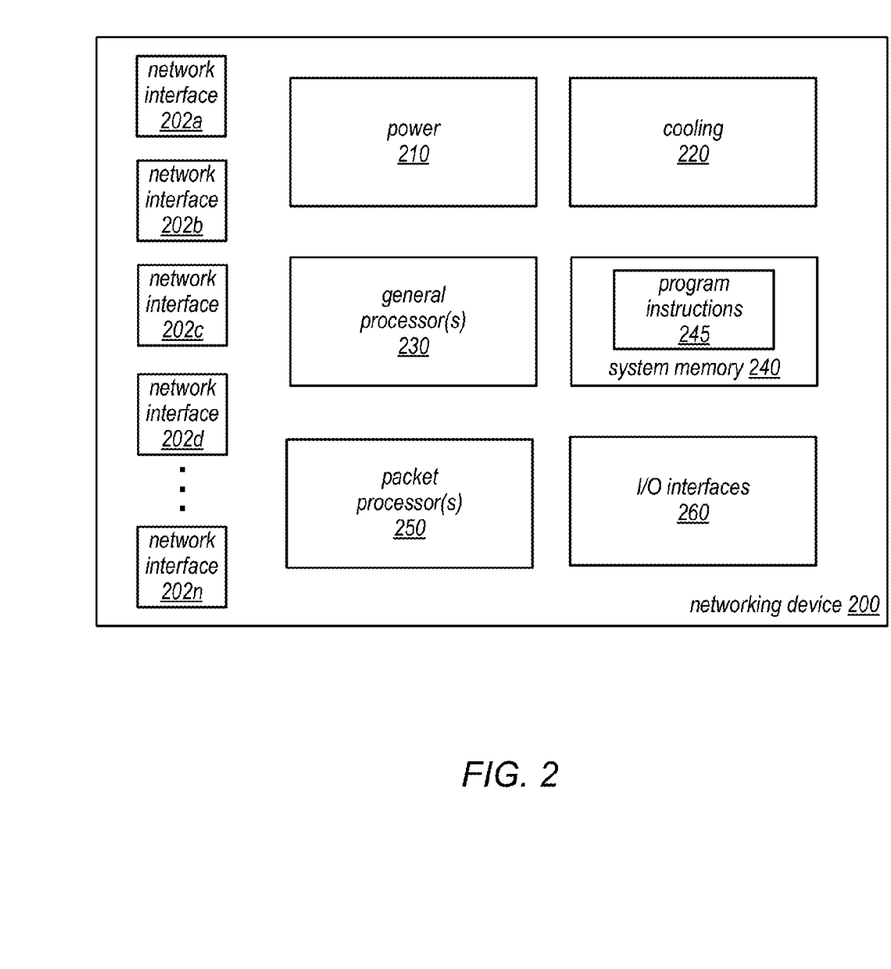
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.). Additionally, a controller may be able to access network packets trapped or logged by a packet processor 250 for further analysis and direct processing actions to be performed by packet processor 250 for the network packet. In at least some embodiments, a controller may be able to extract trace information from a network packet and provide the trace information for analysis (e.g., to another application executing on processor(s) 230 or sending the trace information over a network connection to a different system for analysis).

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
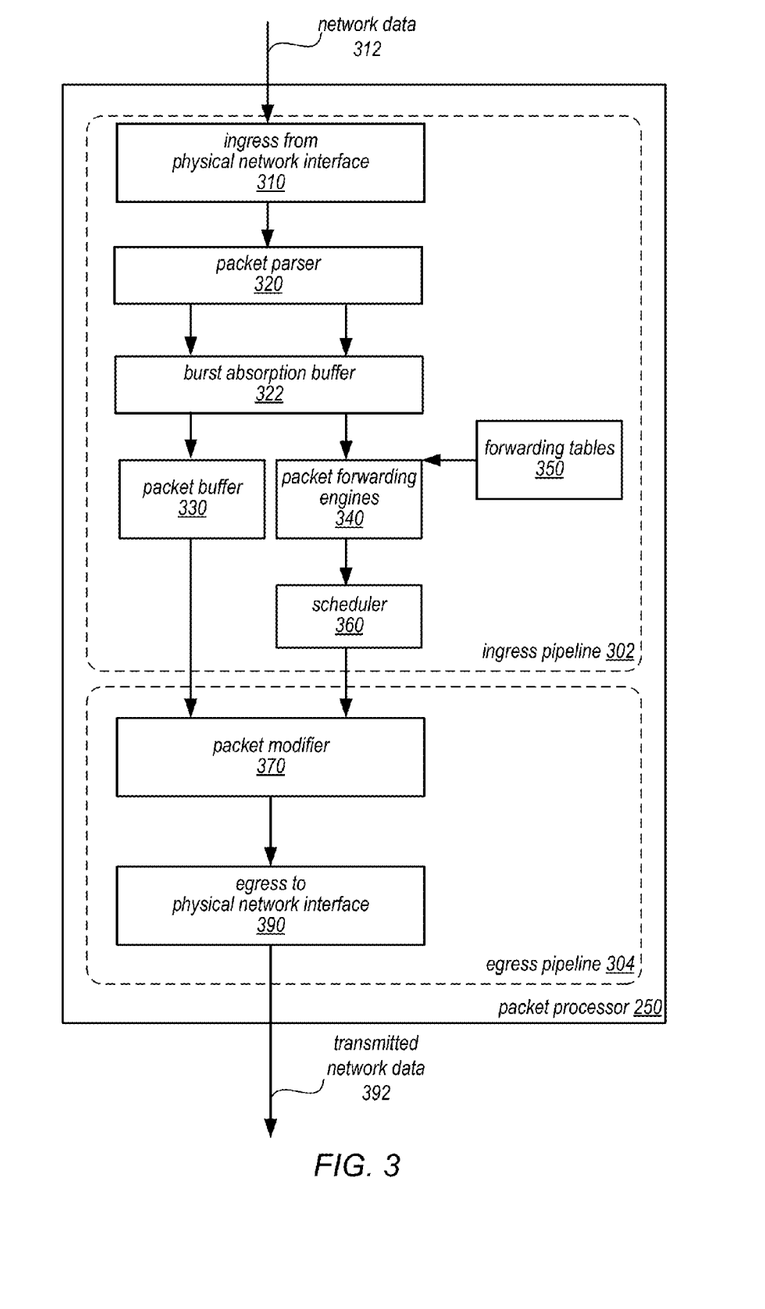
FIG. 3 is a logical block diagram illustrating a packet processor that process network packets utilizing a burst absorption buffer, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that performs network packet tracing, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, burst absorption buffer 322, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340. In some embodiments, a burst absorption buffer 322 may be implemented to arbitrate the ingestion of network packets from parser 320 into packet buffer 330 and packet forwarding engines 340, such as discussed below with regard to FIGS. 4-6.

Packet forwarding engines 340 may access data stored in packet tables 350 to make forwarding and tunneling decisions for the network packet based on information in the packet header (e.g., packet metadata, including source and destination addresses) extracted by packet parser 320. For example, packet forwarding engines 340 may perform lookups for data in layer 2 (L2) portions of the packet to perform L2 forwarding.

Similarly, packet forwarding engines 340 may also perform lookups for data in layer 3 (L3) portions of the packet to perform L3 forwarding, such as L3 forwarding engine 400 discussed in FIG. 4 below, in some embodiments. For example, internet protocol (IP) headers for the packet may be evaluated with respect to entries in tables, such as a routing or next hop table, to determine forwarding to be performed. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
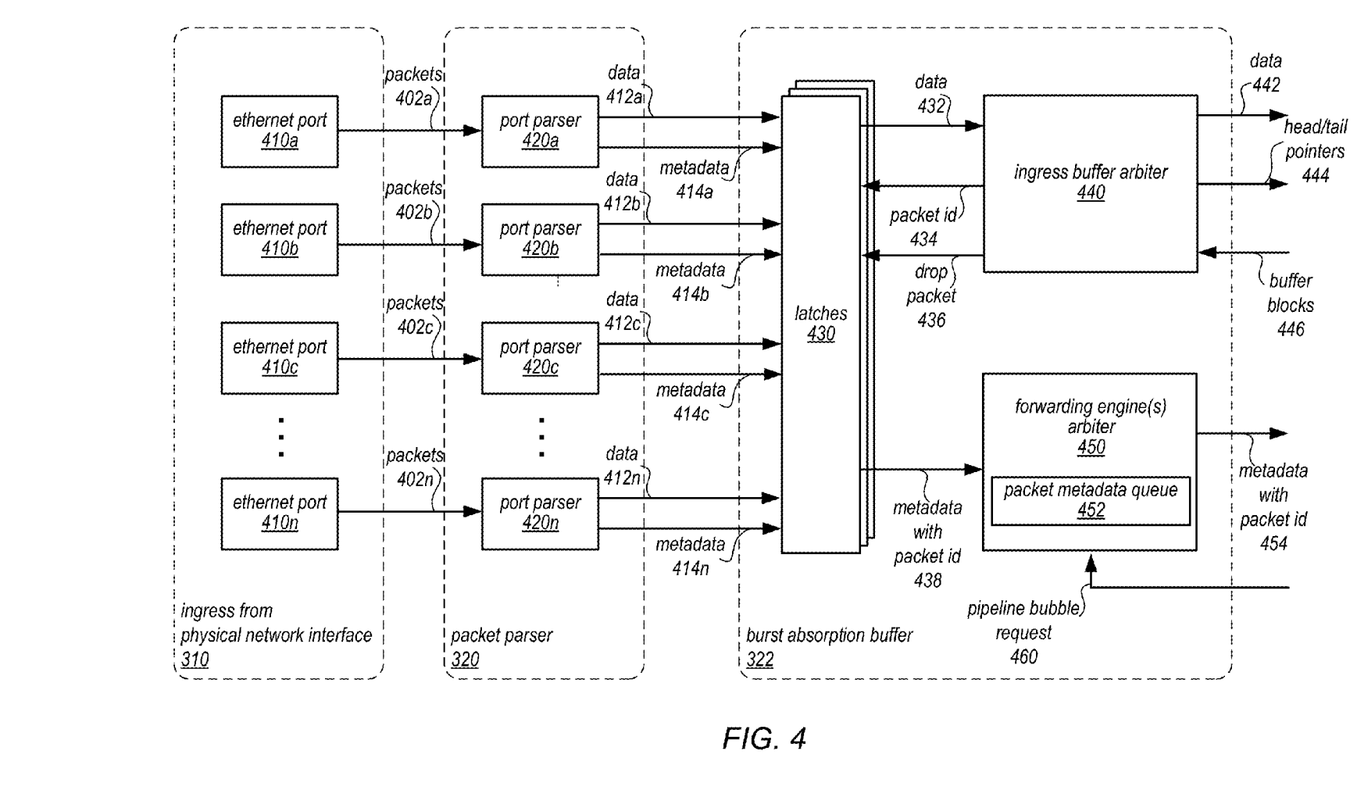
FIG. 4 is a logical block diagram illustrating a burst absorption buffer that implements burst absorption for processing network packets, according to some embodiments.

FIG. 4 is a logical block diagram illustrating a burst absorption buffer that implements burst absorption for processing network packets, according to some embodiments. As illustrated in FIG. 4, ingress from physical network interface 310 may include multiple Ethernet port sub-systems, such as sub-systems for Ethernet ports 410a, 410b, 410c through 410n. Each port sub-system may be responsible for conveying network packets received over a connection to the port for inclusion in the packet processing pipeline. For example, as illustrated in FIG. 4, network packets, such as packets 402a, 402b, 402c through 402n received at the different Ethernet ports 410 may be sent to packet parser stage 320.

Packet parser stage 320 may in various embodiments, implement different parsers to perform packet parsing for each Ethernet port, such as port parsers 420a, 420b, 420c through 420n. Each port parser 420 may perform various operations to detect and determine the values of fields within different headers or layers (such as the OSI model layers) of packets 402. For instance, a port parser may be configured to determine the Layer 2 (L2) field values, such as a source MAC address and destination MAC address. Port parsers 420 may, in various embodiments, provide the network packets to burst absorption buffer 322 in separate forms, data 412 (which may be the payload data of the network packet and/or the header data of the network packet) and metadata 414 (which may be the determined values for the various fields and layers detected at the parser) or any other information derived from a network packet or generated for and associated with a network packet (e.g., based on information found in different lookup tables).

In various embodiments, burst absorption buffer 322 may implement latches 430. Latches 430 may correspond or be dedicated to individual ports, such as to ports 410a, 410b, 410c through 410n. Latches 430 may convey the data for the different ports, received from port parsers, into the packet processing pipeline via ingress buffer arbiter 440 and forwarding engine(s) arbiter 450. For example, when a latch obtains a certain amount of data (e.g., 4 buffer blocks worth or 2 packets worth of metadata and a packet identifier) the latch may send a request to the appropriate arbiter, ingress buffer arbiter 440 or forwarding engine(s) arbiter 450 to get access to the ingress buffer or packet metadata queue 452.

Burst absorption buffer 322 may implement ingress buffer arbiter 440 to select when the latches 430 may convey packet data 432 into an ingress buffer 442. Ingress buffer arbiter may fetch buffer blocks 446 to write to and implement arbitration schemes, such as a round robin arbitration scheme or weighted round robin scheme, to choose a latch 430 that has requested access to the ingress buffer to write to the buffer blocks. Ingress buffer arbiter 440 may also determine a packet identifier for a network packet and provide the packet identifier 434 to the latch so that the latch may convey the packet identifier along with the metadata for the network packet to the forwarding engine(s). In this way, the packet identifier 434 may be synchronized for the data stored in the ingress buffer and the metadata in packet metadata queue 452 and in the packet processing pipeline. Ingress buffer arbiter 440 may also include head and tail pointers for network packets to be included in the ingress buffer.

Burst absorption buffer 322 may also implement forwarding engine(s) arbiter 450 to select latches to convey metadata (along with the determined packet id) to packet metadata queue 452. As with ingress buffer arbiter 440 above, forwarding engine(s) arbiter 450 may implement arbitration schemes, such as a round robin arbitration scheme or weighted round robin scheme, to choose a latch 430 that has requested access to the packet metadata queue to push the metadata for one or more network packets onto the queue 452. Packet metadata queue 452 may be implemented, in some embodiments, as a First-In-First-Out (FIFO) queue so that packet metadata for network packets is processed in the order in which they are received at the queue 452. When metadata for a network packet is popped or de-queued, the metadata along with the packet ide 454 is provided to forwarding engines/stages for processing.

As indicated at 460, a request for a pipeline bubble may be provided to forwarding engine(s) arbiter 450, in some embodiments. As discussed below with regard to FIG. 6, a delay of one or more metadata sets may be imposed on the queue 452 in order to start a bubble through the packet processing pipeline. In at least some embodiments, bubble requests may have priority over processing metadata up to a limit of bubbles.

For packets that are to be dropped in response to lack of buffer space, whether the ingress buffer or packet metadata queue 452, an indication that the packet is to be dropped may be provided to latches 430 convey data for the dropped packet. The latch may then stop conveying data for the dropped packet and take up conveying data for a next network packet.

Please note that the illustration and discussion of FIG. 4 is provided merely as an example implementation of a burst absorption buffer 322. Other configurations of components or techniques may be implemented to arbitrate between streams of network data received at different Ethernet ports 410. For example, instead of implementing latches 430 another arbitration technique may be implemented to select data received from different Ethernet ports 410 to include in the forwarding engine pipeline and ingress buffer. Backpressure may, for instance, be applied to the different Ethernet ports 410 so that data from one port 410 may be allowed at a time into the ingress buffer and forwarding engines (including packet metadata queue 452).

The examples of burst absorption for processing network packets as discussed above with regard to FIGS. 2-4 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may utilize burst absorption for processing network packets. In addition to examples given above, the techniques discussed below with regard to FIGS. 5 and 6 may be also implemented using the various components discussed above as well as different types of systems or devices that perform packet processing.

Figure 5:
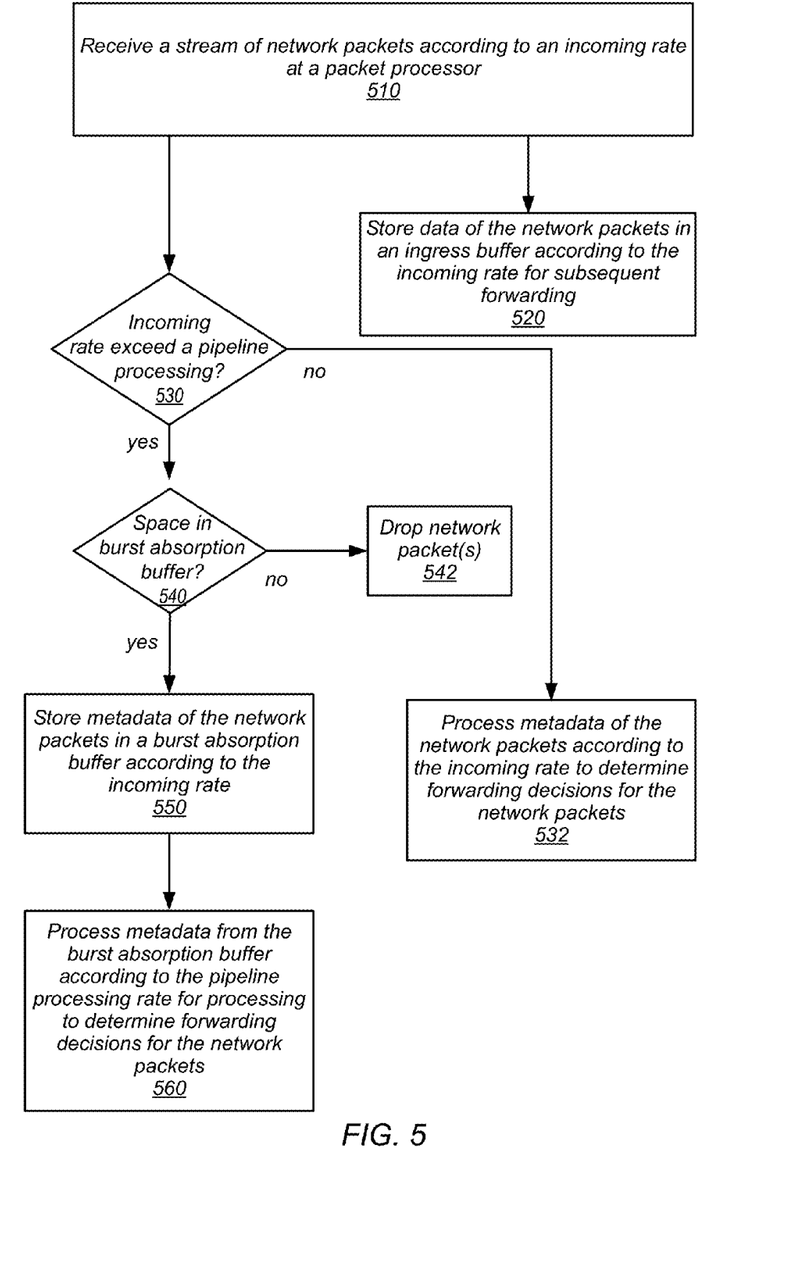
FIG. 5 is a high-level flowchart illustrating various methods and techniques to implement burst absorption for processing network packets, according to some embodiments.

FIG. 5 is a high-level flowchart illustrating various methods and techniques to implement burst absorption for processing network packets, according to some embodiments. As indicated at 510, a stream of network packets may be received at the packet processor according to an incoming rate. Network packets may be a discrete portion of the stream of data transmitted over various types of network connections, such as twisted pair connections, coaxial connections, or fiber optic connections, or other wired or wireless connections formatted according to various transmission protocols to a destination address. A network packet may refer to a unit of data according to layer 3, the network layer, of the open systems interconnection (OSI) model for communications, in some embodiments, or to layer 2, the data-link layer. Layer 3 protocols may include, but are not limited to, protocols such as IP, internet control message protocol (ICMP), IP security (IPsec), routing information protocol (RIP), Border Gateway Protocol (BGP) and many others. Layer 2 protocols may include, but are not limited to, protocols or layers such as Address Resolution Protocol (ARP), Media Access Control (MAC), Link Aggregation Control Protocol (LACP), Open Shortest Path First (OSPF) or Spanning Tree Protocol (STP). Different types of network packets may also refer to the different layers of the Internet protocol suite.

As noted above with regard to FIG. 4, different network interfaces or ports may receive the network packets over a network connection and the data and metadata of the network packets may be parsed and then fed into a single packet processing pipeline according to an arbitration scheme (e.g., ingress buffer arbiter 440 or forwarding engine(s) arbiter 450). For example, a round robin scheme may be implemented to circuitously select the packet data and metadata from different ports, conveyed by latches, to start processing in the packet processing pipeline.

As indicated at 520, the data of the network packets in the stream may be stored in an ingress buffer according to the incoming rate of the stream of network packets, in some embodiments. For example, if each network interface is conveying network packets at the maximum rate possible for the interface, then the data of the network packets may be stored at the ingress buffer according to the combined rate of the individual interfaces. When storing the data of the network packets, a packet identifier may be determined for network packets, which associates the data of the network packet in the ingress buffer with metadata for the network packet. Head and tail pointers for the network packets may also be included when storing data in the ingress buffer. Data for the network packets may remain in the ingress buffer until removed to perform packet egress processing (as discussed above with regard to FIGS. 3 and 4). Note that in scenarios where there is insufficient space in the ingress buffer for network packets, the network packets may be dropped instead of being processed.

In parallel with the storing of the data in the ingress buffer, handling of the metadata may be performed. As indicated at 530, the processing of metadata may be determined according to whether the incoming rate of network packets in the stream exceeds a packet processing rate. For instance, if the packet processing rate is 500 million packets per second (Mpps), then an incoming rate greater than 500 Mpps, such as 600 Mpps exceeds the packet processing rate. Such a determination may be implicitly made if when metadata for a network packet is conveyed from a latch and the metadata may next start the forwarding stages of the processing pipeline, then it may be determined that the incoming rate does not exceed the packet processing rate. However, if the network packet cannot start processing at the next cycle, then it may be determined that the incoming rate of network packets exceeds the packet processing rate.

For those network packets with an incoming rate that does not exceed the packet processing rate, the burst absorption buffer may be skipped (or passed through such that the metadata for the packet starts processing at the next clock cycle), as indicated by the negative exit from 530, the metadata for the network packets may be processed to determine a forwarding decision at the incoming rate.

For those network packets with an incoming rate that exceeds the processing pipeline rate, burst absorption may be applied. As indicated 540, in some embodiments, a determination may be made as to whether space in the burst absorption buffer is sufficient to store the network packet. In those cases where space does not exist, then as indicated at 542, the network packets may be dropped. If space in the burst absorption buffer does exist, then as indicated by the positive exit from 540, the metadata of the network packets may be stored in the burst absorption buffer. The burst absorption buffer, as mentioned above, may, in some embodiments, preserve or determine an ordering for processing network packets that are buffered. A FIFO queue, for instance, may provide an order in which metadata for packets that are received first leave the queue first for subsequent processing. Note that other data structures or ordering schemes may be implemented.

As indicated at 560, metadata may be processed from the burst absorption buffer according to the packet processing rate to determine a forwarding decision for the network packets. For instance, at each available clock cycle (e.g., if a pipeline bubble or other delay is not being applied), the metadata for a next packet in the burst absorption buffer may be removed (e.g., de-queued). The metadata (including a packet identifier determine for the network packet is discussed above) may then be started through the forwarding stages of the packet processor to determine a forwarding decision for the network packet.

Figure 6:
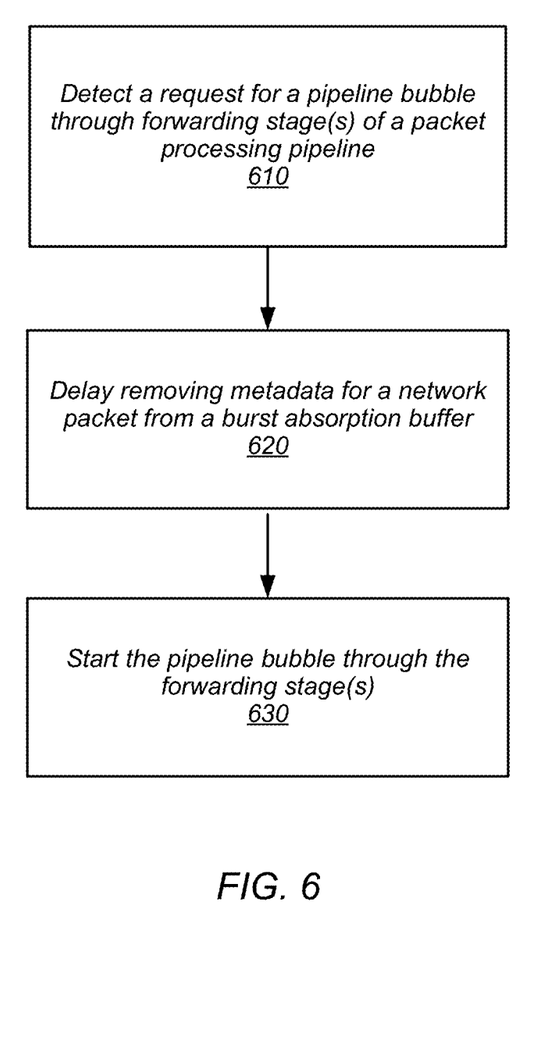
FIG. 6 is a high-level flowchart illustrating various methods and techniques to insert a processing bubble utilizing a burst absorption buffer, according to some embodiments.

In addition to controlling the rate at which metadata for network packets is processed through forwarding stages of a packet processing pipeline, a burst absorption buffer may be used to introduce pipeline bubbles into the packet processing pipeline. FIG. 6 is a high-level flowchart illustrating various methods and techniques to insert a processing bubble utilizing a burst absorption buffer, according to some embodiments. As indicated at 610, a request for a pipeline bubble through forwarding stages of a packet processing pipeline may be detected. For example, a signal or other indication may be provided to a burst absorption buffer (e.g., burst absorption buffer 322 in FIGS. 3 and 4 above) or a control component for a packet processor. The signal or indication may identify a desired pipeline bubble (or number of pipeline bubbles) to be inserted. In at least some embodiments, forwarding stages of a packet processing pipeline may determine the need for pipeline bubbles and generate or otherwise send a signal that requests a pipeline bubble. For example, a forwarding stage may require a free cycle in order read statics from a table or other component. In some embodiments, a controller, such as may be implemented on a general or host processor, may request a pipeline bubble. Consider a scenario where changes to lookup tables may need to be written in order to modify the operation of forwarding engines (e.g., change a forwarding route). A spare cycle may be needed to perform the write to the memory component storing the table, and thus a pipeline bubble may be requested to provide the spare cycle.

As indicated at 620, removal of control metadata for a network packet from a burst absorption buffer may be delayed, in some embodiments. For example, a valid indicator for a queue in the burst absorption buffer may be set to invalid for a cycle, so that no read operation is performed to pop a next set of metadata off of the queue. As indicated at 630, the pipeline bubble may then be started through the forwarding stage(s) of the pipeline. In some embodiments, pipeline bubble requests may have priority over performing processing of packet metadata such that when a request for a pipeline bubble is detected the delay is performed at a next processor clock cycle. In some embodiments, a pipeline bubble limit may be enforced such that a pipeline bubble request may be denied or delayed if the requested pipeline bubble exceeds the pipeline bubble limit. For example, a pipeline bubble limit may be a number of pipeline bubbles within a certain time period or number of processor clock cycles (e.g., no more than 5 bubbles per 100 cycles).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
    a plurality of physical network interfaces;
    a packet processor, configured to:
        receive a stream of network packets via the network interfaces according to an incoming rate, wherein the incoming rate exceeds a packet processing rate for the packet processor;
        parse the stream of network packets to generate respective packet data and packet metadata for the network packets according to the incoming rate;
        write the respective packet data for the network packets in an ingress buffer according to the incoming rate for subsequent forwarding of the network packets;
        queue the respective packet metadata for the network packets in a burst absorption buffer according to the incoming rate; and
        process the respective packet metadata for the network packets de-queued from the burst absorption buffer according to the packet processing rate through one or more forwarding stages to determine respective forwarding decisions for the network packets
        receive another stream of network packets according to a different incoming rate, wherein the different incoming rate is less than the packet processing rate;
        store respective data of the other stream of network packets in the ingress buffer according to the different incoming rate for subsequent forwarding of the other stream of network packets; and
        process respective metadata for different ones of the other network packets according to the different incoming rate to determine forwarding decisions for the other network packets without storing the respective metadata for the other network packets in the burst absorption buffer.

2. The networking device of claim 1, wherein the packet processor comprises a plurality of latches to convey the network packets from different ones of the physical network interfaces, and wherein to write the respective packet data and to queue the respective packet metadata, the packet processor is configured to:
    select different ones of the latches to convey the respective data and the respective metadata.

3. The networking device of claim 1, wherein the packet processor is further configured to:
    detect a request to insert a pipeline bubble from one of the one or more forwarding stages; and
    in response to the detection of the request to insert the pipeline bubble, delay the de-queue of the respective metadata of one of the network packets from the burst absorption buffer in order to start the pipeline bubble through the one or more forwarding stages.

4. The networking device of claim 1, wherein the packet processor is further configured to determine a respective packet identifier that synchronizes the respective data in the ingress buffer and the respective metadata in the burst absorption buffer, wherein the respective packet identifier is included with the respective packet metadata for processing through the one or more forwarding stages.

5. A method, comprising:
    receiving a stream of network packets at a packet processor according to an incoming rate;
    storing, by the packet processor, respective data of the network packets in an ingress buffer according to the incoming rate for subsequent forwarding of the network packets;
    processing, by the packet processor, respective metadata for different ones of the network packets according to a packet processing rate to determine forwarding decisions for the network packets, the processing comprising:
        storing the respective metadata for the stream of network packets in a burst absorption buffer according to the incoming rate, wherein the incoming rate exceeds the packet processing rate; and
        removing the respective metadata for the stream of network packets from the burst absorption buffer for processing according to the packet processing rate
    receiving another stream of network packets at the packet processor according to a different incoming rate, wherein the different incoming rate is less than the packet processing rate;
    storing, by the packet processor, respective data of the other stream of network packets in the ingress buffer according to the different incoming rate for subsequent forwarding of the other stream of network packets; and
    processing, by the packet processor, respective metadata for different ones of the other network packets according to the different incoming rate to determine forwarding decisions for the other network packets without storing the respective metadata for the other network packets in the burst absorption buffer.

6. The method of claim 5, further comprising:
receiving one or more additional network packets at the packet processor;
determining that sufficient space in the burst absorption buffer does not exist to store respective metadata for the one or more additional network packets; and
in response to determining that sufficient space in the burst absorption buffer does not exist, dropping the one or more additional network packets.

7. The method of claim 5, further comprising:
detecting a request to insert a pipeline bubble at the packet processor; and
in response to detecting the request, delaying a removal of the respective metadata for one of the network packets from the burst absorption buffer to insert a pipeline bubble.

8. The method of claim 7, further comprising generating, by the packet processor, the request to insert the pipeline bubble at a forwarding stage of the packet processor.

9. The method of claim 7, further comprising receiving, at the packet processor, the request to insert the pipeline bubble from a controller for the packet processor.

10. The method of claim 5, wherein the respective data is stored in the ingress buffer and the respective metadata is stored in the burst absorption buffer according to an arbitration scheme to select the respective data and the respective metadata from different network interfaces.

11. The method of claim 5, wherein the burst absorption buffer is a First-In-First-Out (FIFO) queue such that the storing of the respective metadata comprises queuing the respective metadata and the removing of the respective metadata comprises de-queuing of the respective metadata.

12. The method of claim 5,
wherein storing the respective data of the network packets in the ingress buffer comprises associating a respective packet identifier with the respective data; and
wherein processing the respective metadata for different ones of the network packets from the burst absorption buffer comprises including the respective packet identifier with the respective metadata.

13. A system, comprising:
a device configured to perform packet processing, the device comprising:
one or more network interfaces configured to transmit and receive packets via a network connection to the device;
a packet processing pipeline, configured to:
receive a stream of network packets via the network interfaces according to an incoming rate;
parse the stream of network packets to generate respective packet data and packet metadata for the network packets;
store the respective packet data for the network packets in an ingress buffer according to the incoming rate for subsequent forwarding of the network packets; and
process the respective packet metadata for the network packets according to the incoming rate through one or more forwarding stages, without storing the respective packet metadata for the network packets in a burst absorption buffer, to determine respective forwarding decisions for the network packets, wherein the incoming rate is less than a packet processing rate for the one or more forwarding stages.

14. The system of claim 13, wherein the packet processing pipeline is further configured to:
receive additional network packets via the network interfaces according to another incoming rate that exceeds the packet processing rate; and
drop the additional network packets.

15. The system of claim 13, wherein the packet processing pipeline is further configured to:
receive additional network packets via the network interfaces according to another incoming rate that exceeds the packet processing rate;
parse the additional network packets to generate respective packet data and packet metadata for the additional network packets;
store the respective packet data for the additional network packets in an ingress buffer according to the other incoming rate for subsequent forwarding of the additional network packets;
queue the respective metadata for the additional network packets in the burst absorption buffer according to the other incoming rate; and
process the respective packet metadata for the additional network packets de-queued from the burst absorption buffer according to the packet processing rate through the one or more forwarding stages to determine respective forwarding decisions for the additional network packets.

16. The system of claim 15, wherein the packet processing pipeline is further configured to:
detect a request for a pipeline bubble through the one or more forwarding stages; and
in response to the detection of the request, delay a de-queue of the respective metadata for one of the additional network packets from the burst absorption buffer to start a pipeline bubble through the one or more forwarding stages.

17. The system of claim 13, wherein the packet processing pipeline comprises a plurality of latches corresponding to different ones of the network interfaces to convey the respective data for the network packets for storage in the ingress buffer and wherein to store the respective packet data, the packet processing pipeline is configured to select different ones of the latches according to an arbitration scheme.

18. The system of claim 13, wherein the packet processing pipeline is configured to include a respective packet identifier along with the respective metadata of the network packets processed through the one or more forwarding stages, wherein the respective packet identifier is associated with the respective data in the ingress buffer of the network packets.

19. The system of claim 13, wherein the device is an application specific integrated circuit (ASIC), a system-on-chip (SoC), or a field-programmable gate array (FPGA).

* * * * *